United States Patent
Lu

(10) Patent No.: US 11,041,985 B2
(45) Date of Patent: Jun. 22, 2021

(54) LIGHTGUIDES WITH ASYMMETRIC LIGHT EXTRACTING STRUCTURES

(71) Applicant: 3M INNOVATIVE PROPERTIES COMPANY, St. Paul, MN (US)

(72) Inventor: Fei Lu, Cupertino, CA (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/136,489

(22) Filed: Sep. 20, 2018

(65) Prior Publication Data

US 2019/0033508 A1  Jan. 31, 2019

Related U.S. Application Data

(62) Division of application No. 14/888,728, filed as application No. PCT/US2014/038553 on May 19, 2014, now Pat. No. 10,107,951.

(Continued)

(51) Int. Cl.
*G02B 6/10* (2006.01)
*F21V 8/00* (2006.01)

(52) U.S. Cl.
CPC ......... *G02B 6/0036* (2013.01); *G02B 6/0001* (2013.01); *G02B 6/0065* (2013.01);
(Continued)

(58) Field of Classification Search
CPC ..... G02B 6/0036; G02B 6/001; G02B 6/0035
See application file for complete search history.

(56) References Cited

U.S. PATENT DOCUMENTS 4,811,507 A * 3/1989 Blanchet .............. G02B 6/0021
362/604
4,929,866 A  5/1990 Murata et al.
(Continued)

FOREIGN PATENT DOCUMENTS

EP  0935091  8/1999
JP  H11-64640  3/1999
(Continued)

OTHER PUBLICATIONS

CRIST, "Optical absorption in polymer glasses by laser calorimetry", Journal of Applied Physics, Feb. 1980, vol. 51, No. 2, pp. 1160-1162, XP55137747.
(Continued)

*Primary Examiner* — Ismael Negron
(74) *Attorney, Agent, or Firm* — Jonathan L. Tolstedt

(57) ABSTRACT

A lightguide defines an optical axis and has an optical absorption coefficient of at least 0.02 $cm^{-1}$ at a wavelength of 500 nm. The light guide includes a plurality of discrete light extracting structures, each with a first surface configured to extract light propagating in a first direction along the light guide, a second surface configured to extract light propagating in a second direction along the light guide, and a light extraction efficiency of less than 2%. The first surface and the second surface in each of the light extracting structures making an angle with each other larger than 90 degrees; the angle between the first and second surfaces of at least one of the light extracting structures being different from the angle between the first and second surfaces of at least another one of the light extracting structures.

2 Claims, 8 Drawing Sheets

Related U.S. Application Data

(60) Provisional application No. 61/827,043, filed on May 24, 2013.

(52) U.S. Cl.
CPC ............ *G02B 6/0066* (2013.01); *G02B 6/001* (2013.01); *G02B 6/0038* (2013.01)

(56) References Cited

U.S. PATENT DOCUMENTS

| | | | | |
|---|---|---|---|---|
| 5,070,431 | A * | 12/1991 | Kitazawa | G02B 6/0021 362/23.15 |
| 5,079,675 | A * | 1/1992 | Nakayama | G02B 6/0038 362/23.15 |
| 5,128,842 | A | 7/1992 | Kenmochi | |
| 5,276,591 | A * | 1/1994 | Hegarty | G02B 6/0036 362/2 |
| 5,432,876 | A * | 7/1995 | Appeldorn | G02B 6/001 362/554 |
| 5,664,862 | A * | 9/1997 | Redmond | G02B 6/001 362/293 |
| 5,791,757 | A * | 8/1998 | O'Neil | B60Q 1/0011 362/556 |
| 5,845,038 | A * | 12/1998 | Lundin | G02B 6/001 362/551 |
| 6,074,069 | A * | 6/2000 | Chao-Ching | G02B 6/0061 362/23.15 |
| 6,340,999 | B1 | 1/2002 | Masuda et al. | |
| 6,343,867 | B1 | 2/2002 | Suzuki et al. | |
| 6,367,941 | B2 * | 4/2002 | Lea | G02B 6/001 362/551 |
| 6,474,824 | B1 | 11/2002 | Wada | |
| 6,565,225 | B2 * | 5/2003 | Mabuchi | G02B 6/0038 362/23.09 |
| 6,652,109 | B2 | 11/2003 | Nakamura | |
| 6,659,615 | B2 | 12/2003 | Umemoto | |
| 6,910,783 | B2 * | 6/2005 | Mezei | G02B 6/001 362/23.09 |
| 7,246,932 | B2 | 7/2007 | Burtsev et al. | |
| 7,549,783 | B2 * | 6/2009 | Cassarly | G02B 6/001 362/555 |
| 8,120,726 | B2 | 2/2012 | Suzuki et al. | |
| 2001/0038539 | A1 | 11/2001 | Lea et al. | |
| 2008/0298080 | A1 | 12/2008 | Wu | |
| 2008/0310187 | A1 * | 12/2008 | Huang | G02B 6/0008 362/615 |
| 2009/0201675 | A1 | 8/2009 | Onishi et al. | |
| 2010/0021896 | A1 | 1/2010 | Han | |
| 2010/0302807 | A1 | 12/2010 | Mi | |
| 2011/0299295 | A1 | 12/2011 | Mochizuki | |
| 2012/0051091 | A1 | 3/2012 | Landry et al. | |
| 2012/0063165 | A1 | 3/2012 | Chien et al. | |
| 2015/0138834 | A1 | 5/2015 | Yagi et al. | |

FOREIGN PATENT DOCUMENTS

| | | |
|---|---|---|
| JP | 2007-334151 | 12/2007 |
| JP | 2008-072626 | 3/2008 |
| JP | 2008-269866 | 11/2008 |
| JP | 2011-008953 | 1/2011 |
| JP | 2011-210530 | 10/2011 |
| JP | 2012-089291 | 5/2012 |
| JP | 2014-086387 | 5/2014 |
| WO | WO 2010-009067 | 1/2010 |
| WO | WO 2011/056811 | 5/2011 |
| WO | WO 2012-114553 | 8/2012 |

OTHER PUBLICATIONS

International Search Report for PCT International Application No. PCT/US2014/038553, dated Sep. 11, 2014, 4pgs.

* cited by examiner

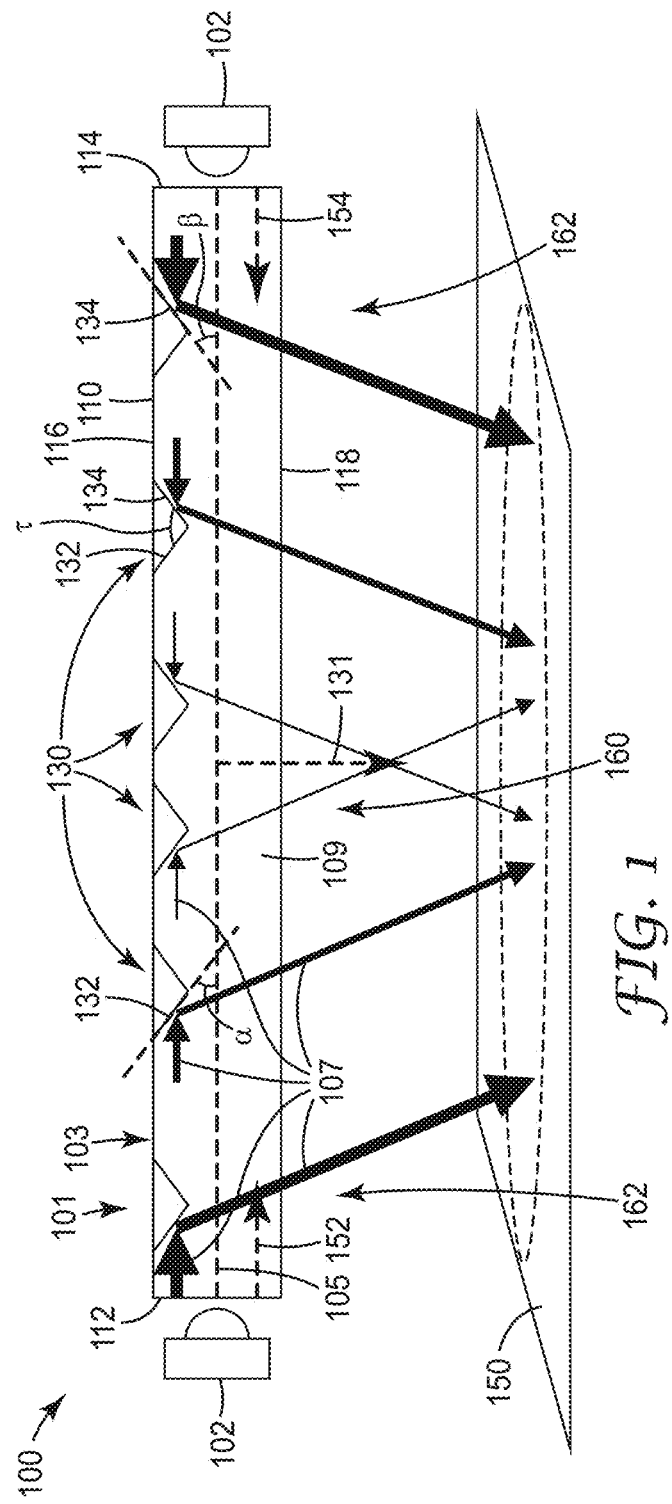
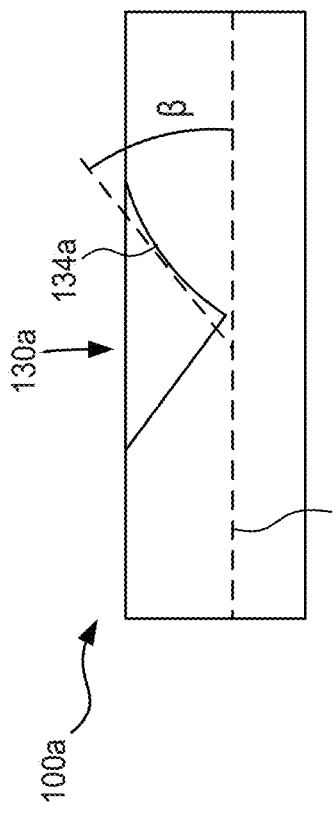
FIG. 1
FIG. 1A

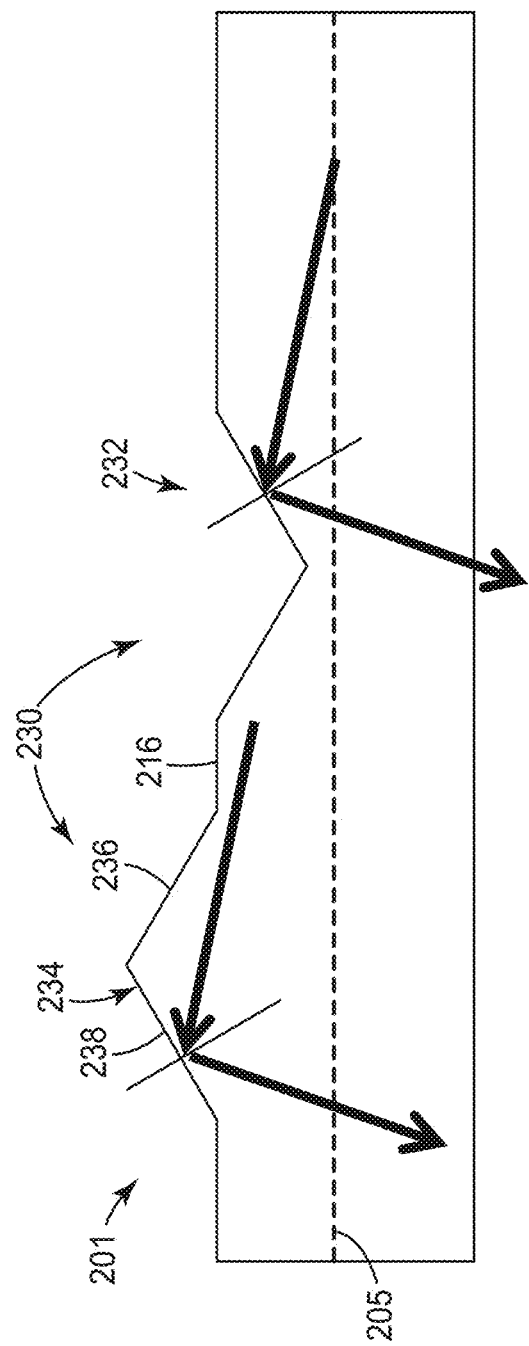

LIGHTGUIDES WITH ASYMMETRIC LIGHT EXTRACTING STRUCTURES

FIELD

The disclosure relates to lightguides and, in particular, to lightguides that include a plurality of light extracting structures.

BACKGROUND

Lightguides are increasingly being used for decorative and functional lighting purposes in various locations, some of which require the lightguide to emit light selectively (e.g., comparatively uniformly or in a particular direction) along its length. Such lightguides may be referred to as side-lightguides. Various mechanisms are known for enabling light that is injected into a lightguide from a light source at one end or two ends to be extracted selectively from the lightguide along its length to provide, effectively, a linear lighting device. It is recognized that the use of lightguides in linear lighting devices may offer advantages that include, e.g., the use a low voltage light source such as a light emitting diode (LED) light source, separation of the light source from the area in which the lighting device is located, etc.

As light propagates through a lossy lightguide, some light is absorbed in the lightguide. Therefore, light extracted from the lightguide may have reduced power and color uniformity.

BRIEF SUMMARY

The disclosure relates to lightguides and, in particular, to lightguides that include a plurality of light extracting structures, among other aspects.

One exemplary lightguide may be centered on an optical axis (e.g., having a round, oval, square, or rectangular cross-section in a direction perpendicular to the optical axis, being flexible and/or rigid, etc.) and include a plurality of discrete light extracting structures next to and spaced apart from each other. Each light extracting structure may include a first surface extending from a first side of the lightguide and may be adapted to extract light propagating in a first direction along the optical axis from an opposite second side of the lightguide by reflecting the propagating light toward the second side (e.g., light may propagate along the first direction along the optical axis by total internal reflection, the first surface of each light extracting structure may be adapted to extract light propagating in the first direction along the optical axis from the second side of the lightguide by reflecting the propagating light toward the second side primarily by total internal reflection, etc.). The first surface may make a first angle with the optical axis that is less than 45 degrees and greater than 10 degrees. In at least one embodiment, for at least one discrete light extracting structure, the first surface may extend from the first side of the lightguide toward the optical axis and into a core of the lightguide resulting in the light extracting structure being a notch. In at least one embodiment, for at least one discrete light extracting structure, the first surface may extend from the first side of the lightguide away from the optical axis and a core of the lightguide resulting in the light extracting structure being a protrusion. In at least one embodiment, at least one discrete light extracting structure in the plurality of discrete light extracting structures may be a notch and at least one other discrete light extracting structure in the plurality of discrete light extracting structures may be a protrusion. In at least one embodiment, each discrete light extracting structure in the plurality of discrete light extracting structures is a notch. In at least one embodiment, each discrete light extracting structure in the plurality of discrete light extracting structures may be a protrusion.

In one or more embodiments, the exemplary lightguides may have a mushroom shape cross-section in a direction perpendicular to the optical axis. The mushroom shape may include a top portion disposed on a bottom portion. The top portion may be narrower and include the first side and the light extracting structures of the lightguide. The bottom portion may be wider and include the opposite second side of the lightguide. In at least one embodiment, the top portion may include two opposing substantially parallel planar sides.

In one or more embodiments, the first side may include an arcuate first surface and the second side may include an arcuate second surface.

In one or more embodiments, the lightguide may include opposing third sides, each third side extending inwardly from a corresponding outer edge of the second side, and opposing fourth sides, each fourth side extending from an inner edge of a corresponding third side to an outer edge of the first side. In at least one embodiment, the opposing fourth sides may be substantially parallel to each other. In at least one embodiment, the opposing fourth sides are substantially planar.

In one or more embodiments, the lightguide may include a plane of symmetry that includes the optical axis.

In one or more embodiments, the lightguide may have an active length defined as a distance between a first light extracting structure closest to an input face of the lightguide and a last light extracting structure farthest from the input face, the active length being at least 200 mm, at least 500 mm, at least 1000 mm, at least 2 meters, at least 3 meters, at least 5 meters, at least 10 meters, at least 500 mm long, at least 1 meter long, at least 2 meters long, at least 5 meters long, at least 10 meters long, etc.

In one or more embodiments, the lightguide may have a core (e.g., an optically homogenous core) having an index of refraction in a range from 1.3 to 1.65, in a range from 1.4 to 1.6, in a range from 1.5 to 1.6, in a range from 1.5 to 1.55, etc. In at least one embodiment, the lightguide may further include cladding (e.g., including metal) surrounding the core. In at least one embodiment, the cladding may have an index of refraction in a range from 1 to 1.6, in a range from 1 to 1.5, in a range from 1 to 1.4, in a range from 1 to 1.3, in a range from 1 to 1.2, etc.

In one or more embodiments, the lightguide may have an optical absorption coefficient at a wavelength of 500 nm that is at least 0.01 cm$^{-1}$, at least 0.015 cm$^{-1}$, at least 0.018 cm$^{-1}$, at least 0.019 cm$^{-1}$, at least 0.02 cm$^{-1}$, at least 0.025 cm$^{-1}$, at least 0.03 cm$^{-1}$, etc.

In one or more embodiments, the lightguide may have an optical absorption coefficient $\theta$ at 500 nm, and an active length d defined as a distance between a first light extracting structure closest to an input face of the lightguide and a last light extracting structure farthest from the input face, wherein $\theta \cdot d$ is at least 1, at least 1.5, at least 2, at least 2.5, at least 3, etc.

In one or more embodiments, the first surface of at least one light extracting structure may include a light reflecting layer for increasing a reflectance of the first surface. In at least one embodiment, the first surface may be exposed to air. In at least one embodiment, the first surface of each light extracting structure may be substantially planar. In at least one embodiment, the first surface of at least one light extracting structure may include an arcuate surface and at least one plane tangent to the arcuate surface may make a first angle with the optical axis that is less than 45 degrees and greater than 10 degrees.

In one or more embodiments, at least two light extracting structures in the plurality of discrete spaced apart light extracting structures may have different associated first angles. In at least one embodiment, the first angle may be less than 45 degrees and greater than 20 degrees, less than 45 degrees and greater than 30 degrees, less than 40 degrees and greater than 30 degrees, etc.

In one or more embodiments, each light extracting structure further may include a second surface extending from the first side of the lightguide and being adapted to extract light propagating in a second direction that is opposite the first direction along the optical axis from the second side of the lightguide by reflecting the propagating light toward the second side. The second surface may make a second angle with the optical axis that is less than 45 degrees and greater than 10 degrees. In at least one embodiment, for at least one discrete light extracting structure, the second surface may extend from the first side of the lightguide toward the optical axis and into a core of the lightguide resulting in the light extracting structure being a notch. In at least one embodiment, for at least one discrete light extracting structure, the second surface may extend from the first side of the lightguide away from the optical axis and a core of the lightguide resulting in the light extracting structure being a protrusion. In at least one embodiment, at least one discrete light extracting structure in the plurality of discrete light extracting structures may be a notch and at least one other discrete light extracting structure in the plurality of discrete light extracting structures may be a protrusion. In at least one embodiment, each discrete light extracting structure in the plurality of discrete light extracting structures may be a notch. In at least one embodiment, each discrete light extracting structure in the plurality of discrete light extracting structures may be a protrusion.

In one or more embodiments, the second angle may be less than 45 degrees and greater than 20 degrees, less than 45 degrees and greater than 30 degrees, less than 40 degrees and greater than 30 degrees, etc. In at least one embodiment, the second angle may be different from the first angle.

In one or more embodiments, the second surface of each light extracting structure may be substantially planar.

In one or more embodiments, the second surface of at least one light extracting structure may include an arcuate surface and at least one plane tangent to the arcuate surface may make a second angle with the optical axis that is less than 45 degrees and greater than 10 degrees.

In one or more embodiments, the first and second surfaces of each light extracting structure may intersect at a linear peak having a peak angle that is greater than 90 degrees and less than 150 degrees, greater than 100 degrees and less than 140 degrees, greater than 100 degrees and less than 120 degrees, etc.

In one or more embodiments, at least one light extracting structure may include a V-shaped cross-section in a direction parallel to the optical axis.

In one or more embodiments, a separation, or separation distance, between two neighboring light extracting structures may change linearly across the plurality of discrete light extracting structures.

In one or more embodiments, a separation, or separation distance, between two neighboring light extracting structures may be different from a separation between two other neighboring light extracting structures.

In one or more embodiments, a separation between each two neighboring light extracting structures may be in a range from 0.5 mm to 10 mm.

In one or more embodiments, the lightguide may have an optical absorption coefficient of at least 0.015 $cm^{-1}$ at a wavelength of 500 nm and may be adapted to receive an incident light having a first power and an $x_1$ color coordinate in a range from 0.2 to 0.4 and a $y_1$ color coordinate in a range from 0.1 to 0.4 from an input face of the lightguide. The received light may propagate within the lightguide in the first direction along the optical axis and may be extracted by the plurality of discrete light extracting structures and exit the lightguide from the second side as an output light having a second power and ($x_2$, $y_2$) color coordinates, a ratio of the second power to the first power being at least 5% or at least 10%, an absolute value of a difference between $x_1$ and $x_2$ being no more than 0.03 and an absolute value of a difference between $y_1$ and $y_2$ being no more than 0.05.

In one or more embodiments, the lightguide may have an optical absorption coefficient of at least 0.019 $cm^{-1}$ at a wavelength of 500 nm.

In one or more embodiments, the lightguide may be adapted to receive an incident light having an $x_1$ color coordinate in a range from 0.25 to 0.35 from the input face of the lightguide, in a range from 0.28 to 0.32 from the input face of the lightguide, etc. and/or an incident light having an $y_1$ color coordinate in a range from 0.15 to 0.35 from the input face of the lightguide, in a range from 0.2 to 0.3 from the input face of the lightguide. In at least one embodiment, the absolute value of the difference between $x_1$ and $x_2$ is no more than 0.02, no more than 0.01, etc. and/or the absolute value of the difference between $y_1$ and $y_2$ is no more than 0.04, no more than 0.03, no more than 0.02, etc.

In one or more embodiments, the ratio of the second power to the first power is at least 10%, at least 20%, at least 30%, at least 40%, at least 50%, etc.

One exemplary lighting system may include a light source adapted to emit light having a first power and an $x_1$ color coordinate in a range from 0.2 to 0.4 and a $y_1$ color coordinate in a range from 0.1 to 0.4 and an exemplary lightguide as described herein. The lightguide may include an optical absorption coefficient of at least 0.015 $cm^{-1}$ at a wavelength of 500 nm and an input face for receiving light emitted by the light source. The received light may propagate within the lightguide in the first direction along the optical axis and may be extracted by the plurality of discrete light extracting structures and exit the lightguide from the second side as an output light having a second power and ($x_2$, $y_2$) color coordinates, a ratio of the second power to the first power being at least 5% or at least 10%, an absolute value of a difference between $x_1$ and $x_2$ being no more than 0.03 and an absolute value of a difference between $y_1$ and $y_2$ being no more than 0.05.

In one or more embodiments, the lightguide may be adapted to receive an incident light having a first power from an input face of the light guide, the received light propagating within the lightguide in the first direction along the optical axis, being extracted by the plurality of discrete light extracting structures, and exiting the lightguide from the second side as an output light propagating along a central output direction and having a second power. A ratio of the second power to the first power may be at least 5%. The output light may have an intensity profile in a plane that includes the optical axis and the central output direction and the intensity profile may have a peak at substantially a center of the intensity profile.

In one or more embodiments, an active length may be defined as a distance between a first light extracting structure closest to the input face of the lightguide and a last light extracting structure farthest from the input face. A ratio of a full width at half maximum (FWHM) of the intensity profile to the active length may be at least 50%.

One exemplary lightguide may include a plurality of discrete spaced apart light extracting structures and may have an optical absorption coefficient of at least 0.01 cm$^{-1}$ at a wavelength of 500 nm. Each light extracting structure may be adapted to extract light propagating within the light guide by total internal reflection and may have an extraction efficiency of less than 2%. The lightguide may be adapted to receive an incident light having a first power, an $x_1$ color coordinate in a range from 0.2 to 0.4, and a $y_1$ color coordinate in a range from 0.1 to 0.4 from an input face of the light guide. The received light may propagate within the lightguide by total internal reflection, may be extracted by the plurality of discrete light extracting structures, and may exit the lightguide as an output light having a second power and $(x_2, y_2)$ color coordinates. A ratio of the second power to the first power may be at least 10% or at least 5%. An absolute value of a difference between $x_1$ and $x_2$ may be no more than 0.03 and an absolute value of a difference between $y_1$ and $y_2$ may be no more than 0.05.

One exemplary lightguide may be centered on an optical axis and may include a plurality of discrete light extracting structures. Each light extracting structure may include a first surface extending from a first side of the lightguide and being adapted to extract light propagating in a first direction along the optical axis from an opposite second side of the lightguide by reflecting the propagating light toward the second side. For each of at least 50%, 60%, 70%, 80%, 85%, 90%, 95%, etc. of the light extracting structures in the plurality of light extracting structures, the first surface may make a first angle with the optical axis that is less than 45 degrees and greater than 10 degrees.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

The disclosure may be more completely understood in consideration of the following detailed description of various embodiments of the disclosure in connection with the accompanying drawings, in which:

FIGS. 1 and 1A provide diagrammatic views of an exemplary lightguide;

FIG. 3 is a diagrammatic view of a portion of an exemplary lightguide having light extracting structures including a protrusion and a notch.

DETAILED DESCRIPTION

Figure 2:
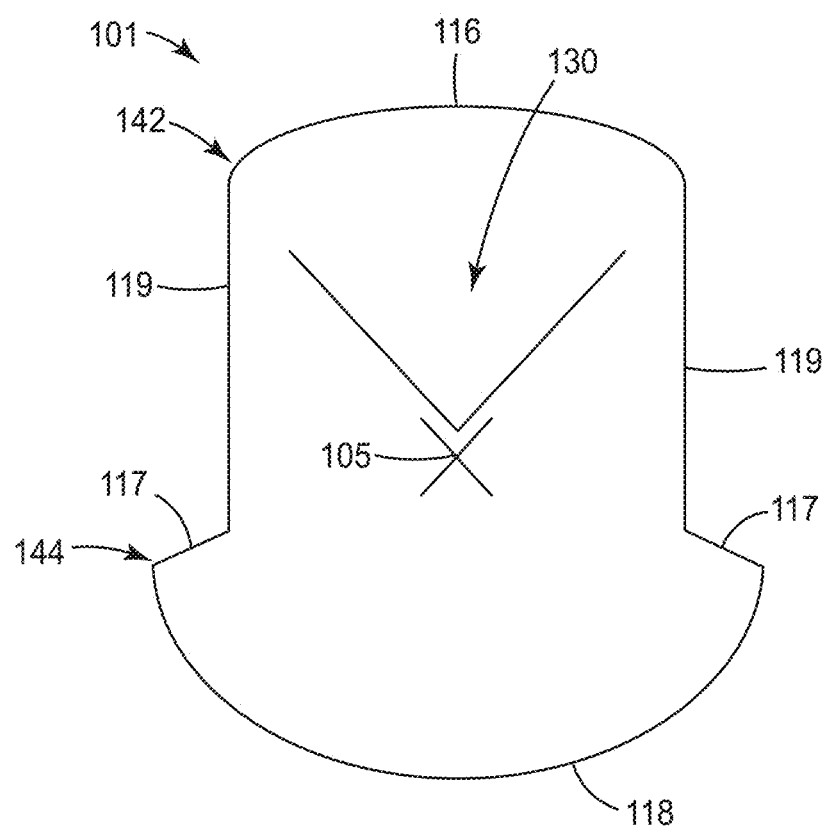
FIG. 2 is cross section of an exemplary lightguide.

In the following detailed description, reference is made to the accompanying drawings that form a part hereof, and in which are shown by way of illustration several specific embodiments. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being "directly on," "directly connected to," "directly coupled with," or "directly in contact with" another element, there are no intervening elements, components or layers for example.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

The present disclosure relates to lightguides and, in particular, to lightguides that include a plurality of light extracting structures. The plurality of light extracting structures may be one or more various types of structures formed on and/or within the exemplary lightguides as described further herein.

Generally, the lightguides may include a notch or protrusion angle greater than 90 degree, which may be dependent on the distance from the lightguide to the illuminated plane, to extract light from the beginning edge of the lightguide, and direct it toward the center portion of the illuminated plane to balance out the light uniformity while significantly reducing the amount of light being absorbed through the lightguide. Therefore, the exemplary lightguides described herein may be able to significantly mitigate the impact of material loss, and achieve illumination uniformity, less color shift and system efficiency optimization.

An exemplary lighting system 100 is depicted in FIG. 1. The lighting system 100 includes a lightguide 101 and a plurality of light sources (as shown, two light sources) 102. The light sources 102 may be any device cable of emitting light such as, e.g., light emitting diodes, fluorescent lights, noble gas lights, incandescent lights, etc.

At least one exemplary lightguide 101 may be described as being a side-emitting lightguide that is configured to receive light from either end of the lightguide 101 and redirect, or reflect, the received light along one or more sides of the lightguide 101 along at least a portion of the length of the lightguide 101 (e.g., a plurality of portions of the length, the entire length, etc.).

As shown, the exemplary lightguide 101 may include a body 103 and a plurality of light extracting structures 130. The body 103 may extend from a first end 112 to a second end 114 along an optical axis 105 and may define a first, or top, side 116 and a second, or bottom, side 118 opposite the first side 116. In other embodiments, the body 103 may include more than two ends (e.g., three ends, four ends, etc.) and may extend in multiple directions (e.g., three directions, four directions, etc.) with each end/direction including its own light source.

Further, the body 103 of the exemplary lightguide 101 may define various different cross-sectional shapes when taken across the optical axis 105. For example, the body 103 may define a circular or round cross-sectional shape, a teardrop cross-sectional shape, an oval cross-sectional shape, a mushroom cross-sectional shape, a square cross-sectional shape, a rectangular cross-sectional shape, a wedge cross-sectional shape, any polygonal cross-sectional shape, etc.

An exemplary lightguide 101 may include a body 103 that defines a mushroom cross-sectional shape is depicted in FIG. 2. As shown, the body 103 may include a top portion 142 disposed on, or coupled to, a bottom portion 144. The top portion 142 may be narrower than the bottom portion 144 and may define the first side 116 and the light extracting structures 130 of the lightguide 101. The bottom portion 144 may be wider than the top portion 142 and may define the opposite second side 118 of the lightguide 101. As further shown, the first side 116 may be arcuate or curved and/or the second side 118 may arcuate or curved. Although as shown both the first and second sides 116, 118 are arcuate, only one of the first and second sides 116, 118 may be arcuate while the other defines another shape such as, e.g., planar. For example, the first side 116 may be planar while the second side 118 is arcuate, and vice versa.

The lightguide 101 may further, define opposing third side surfaces 117 and fourth side surfaces 119. The third side surfaces 117 may extend inwardly from a corresponding outer edge of the second side 118 and the fourth side surfaces 119 may extend from an inner edge of a corresponding third side surface 117 to the first side 116. As shown, for example, the fourth side surfaces 119 may be substantially parallel and/or planar. Further, the side surfaces 117, 119 may not be planar such as arcuate, ridged, etc.

The body 103 of the lightguide 101 may be symmetric about one or more planes that extend through the optical axis 105. For example, as shown in the cross-sectional view of lightguide 101 having the mushroom-shaped cross-section in FIG. 2, the lightguide 101 may be symmetric about a vertical axis extending through the optical axis 105. In other words, when viewing the cross section of FIG. 2, the left side (i.e., left of the optical axis 105) of the lightguide 101 may mirror the right side (i.e., right of the optical axis 105) of the lightguide 101. In at least one embodiment, the lightguide 101 may be symmetric about a horizontal axis (e.g., the top portion 142 may mirror the bottom portion 144).

The body 103 of the lightguide 101 may include (e.g., be formed of) one or more materials such as, e.g., one or more polymers (e.g., urethanes, acrylics, polycarbonates, etc.), glass, etc. Further, the lightguide 101 may be flexible (e.g., resilient etc.) or rigid (e.g., inflexible, unbendable, not resilient, etc.). The lightguide 101 may be formed, or manufactured, using any suitable process such as, e.g., molding, extruding, printing, deposition, etc. In at least one embodiment, the lightguide 101 may be formed by injection molding.

The body 103 of the lightguide 101 may define a length extending from the first end 112 to the second end 114. The length may be greater than or equal to about 200 millimeters (mm), greater than or equal to about 500 mm, greater than or equal to about 1000 mm, greater than or equal to about 2 meters, greater than or equal to about 3 meters, greater than or equal to about 5 meters, greater than or equal to about 10 meters, greater than or equal to about 20 meters, greater than or equal to about 30 meters, greater than or equal to about 50 meters, etc. and/or less than or equal to about 1000 mm, less than or equal to about 2 meters, less than or equal to about 3 meters, less than or equal to about 5 meters, less than or equal to about 10 meters, less than or equal to about 20 meters, less than or equal to about 30 meters, less than or equal to about 50 meters, less than or equal to about 100 meters, etc.

Further, one or more portions of the length or the entire length of the body 103 may be configured to emit light therefrom. The one or more portions of the length that are configured to emit light may be referred to as "active." In other words, portions of the body 103 may not be configured to emit light therefrom but may be configured to transfer light down the length of the body 103 along the optical axis 105 to other portions that are configured to emit light therefrom. Thus, the body 103 may be defined in terms of "active" and "inactive" portions, regions, lengths, etc.

In an exemplary lightguide 101 that includes a single active portion, an active length may be define as a distance between a first light extracting structure 130 closest to an input face, e.g., the face proximate the first end 112, of the lightguide 101 and a last light extracting structure farthest 130 from the input face. The exemplary lightguide 101 may be built, or configured, for a plurality of different applications requiring different lighting requirements such as active lengths. Thus, the exemplary lightguide 101 may have an active length that is greater than or equal to about 200 millimeters (mm), greater than or equal to about 500 mm, greater than or equal to about 1000 mm, greater than or equal to about 2 meters, greater than or equal to about 3 meters, greater than or equal to about 5 meters, greater than or equal to about 10 meters, greater than or equal to about 20 meters, greater than or equal to about 30 meters, greater than or equal to about 50 meters, etc. and/or less than or equal to about 1000 mm, less than or equal to about 2 meters, less than or equal to about 3 meters, less than or equal to about 5 meters, less than or equal to about 10 meters, less than or equal to about 20 meters, less than or equal to about 30 meters, less than or equal to about 50 meters, less than or equal to about 100 meters, etc.

The body 103 of the lightguide 101 may include one or more portions or regions that include various materials, each material having various properties. For example, the body 103 may include a core 109 and cladding 110 surrounding at least a portion of the core 109. The core 109 may include materials such as, e.g., one or more polymers (e.g., urethanes, acrylics, polycarbonates, etc.), glass, etc. In at least one embodiment, the core 109 may be optically homogenous (e.g., refractive index may be substantially the same throughout, refractive index of the core material may vary less than or equal to 15%, less than or equal to 10%, less than or equal to 7%, less than or equal to 5%, less than or equal to 3%, less than or equal to 2%, less than or equal to 1%, etc.). The cladding 110 may include (e.g., be formed of) metal such as, e.g., silver, aluminum, gold, alloys thereof, etc. and may be configured to have a high reflectance (e.g., greater than or equal to about 90%). When light is injected or delivered to the ends 112, 114 of the body 103, the light may propagate in either direction along the optical axis 105 (e.g., depending on which end the light was injected) by total internal reflection, e.g., by the core 109 and/or cladding 110.

The core 109 may have a selected, or particular, index of refraction. The index of refraction of the core 109 may be in a range from about 1.3 to about 1.65, about 1.4 to about 1.6, about 1.5 to about 1.6, about 1.5 to about 1.55, etc. For example, the index of refraction of the core 109 may be greater than or equal to about 1.2, greater than or equal to about 1.3, greater than or equal to about 1.35, greater than or equal to about 1.4, greater than or equal to about 1.45, greater than or equal to about 1.5, etc. and/or less than or equal to about 1.7, less than or equal to about 1.65, less than or equal to about 1.6, less than or equal to about 1.55, etc.

The core 109 and/or cladding 110, taken alone or together, may have a selected, or particular, optical absorption coefficient. For example, the optical absorption coefficient at a wavelength of 500 nanometers (nm) may be greater than or equal to about 0.01 $cm^{-1}$, greater than or equal to about 0.015 $cm^{-1}$, greater than or equal to about 0.018 $cm^{-1}$, greater than or equal to about 0.019 $cm^{-1}$, greater than or equal to about 0.02 $cm^{-1}$, greater than or equal to about 0.025 $cm^{-1}$, greater than or equal to about 0.03 $cm^{-1}$, etc. and/or less than or equal to about 0.04 $cm^{-1}$, less than or equal to about 0.035 $cm^{-1}$, less than or equal to about 0.03 $cm^{-1}$, less than or equal to about 0.025 $cm^{-1}$, less than or equal to about 0.02 $cm^{-1}$, etc.

Further, the lightguide 101 may described in relative terms using the active length of the body 103 and the optical absorption coefficient. For example, the lightguide 101 may have an optical absorption coefficient θ at 500 nm and an active length d defined as a distance between a first light extracting structure 130 closest to an input face such as the first end 112 of the body 103 of the lightguide 101 and a last light extracting structure 130 farthest from the input face, wherein θd is greater than or equal to about 1, greater than or equal to about 1.5, greater than or equal to about 2, greater than or equal to about 2.5, greater than or equal to about 3, greater than or equal to about 3.5, greater than or equal to about 4, etc. and/or less than or equal to about 5, less than or equal to about 4.5, less than or equal to about 4, less than or equal to about 3.5, less than or equal to about 3, less than or equal to about 2.5, less than or equal to about 2, etc.

The cladding 110 may have a selected, or particular, index of refraction. The index of refraction of the cladding 110 may be in a range from about 1 to about 1.6, about 1 to about 1.5, about 1 to about 1.4, about 1 to about 1.3, about 1 to about 1.2, about 1 to about 1.1, etc. For example, the index of refraction of the cladding 110 may be greater than or equal to about 1, greater than or equal to about 1.05, greater than or equal to about 1.1, greater than or equal to about 1.2, etc. and/or less than or equal to about 1.7, less than or equal to about 1.6, less than or equal to about 1.5, less than or equal to about 1.4, less than or equal to about 1.3, less than or equal to about 1.25, less than or equal to about 1.2, less than or equal to about 1.15, less than or equal to about 1.1, less than or equal to about 1.05, etc.

As described herein, the exemplary lightguide 101 may include one or more (e.g., one, two or more, a plurality, etc.) light extracting structures 130. For example, the exemplary lightguide 101 may include greater than or equal to about 50 light extracting structures, greater than or equal to about 100 light extracting structures, greater than or equal to about 150 light extracting structures, greater than or equal to about 200 light extracting structures, greater than or equal to about 250 light extracting structures, greater than or equal to about 300 light extracting structures, greater than or equal to about 400 light extracting structures, greater than or equal to about 500 light extracting structures, greater than or equal to about 600 light extracting structures, greater than or equal to about 1000 light extracting structures, etc. and/or less than or equal to about 2500 light extracting structures, less than or equal to about 2000 light extracting structures, less than or equal to about 1500 light extracting structures, less than or equal to about 1250 light extracting structures, less than or equal to about 1000 light extracting structures, less than or equal to about 900 light extracting structures, less than or equal to about 750 light extracting structures, less than or equal to about 500 light extracting structures, less than or equal to about 250 light extracting structures, etc. Further, the light extracting structures 130 within an exemplary lightguide may be described in terms of density-light extracting structures 130 per measure of distance. For example, the exemplary lightguide 101 may include greater than or equal to about 1 light extracting structures per centimeter (cm), greater than or equal to about 2 light extracting structures per cm, greater than or equal to about 3 light extracting structures per cm, greater than or equal to about 5 light extracting structures per cm, greater than or equal to about 7 light extracting structures per cm, greater than or equal to about 10 light extracting structures per cm, greater than or equal to about 15 light extracting structures per cm, etc. and/or less than or equal to about 25 light extracting structures per cm, less than or equal to about 20 light extracting structures per cm, less than or equal to about 15 light extracting structures per cm, less than or equal to about 12 light extracting structures per cm, less than or equal to about 10 light extracting structures per cm, less than or equal to about 7 light extracting structures per cm, less than or equal to about 6 light extracting structures per cm, less than or equal to about 5 light extracting structures per cm, etc.

Further, the light extracting structures 130 may be described in terms of separation between the structures 130. The separation (e.g., linear distance) between the light extracting structures 130 may be in the range of about 0.5 mm to about 30 mm. For example, the separation between the light extracting structures 130 may be greater than or equal to about 0.1 mm, greater than or equal to about 0.2 mm, greater than or equal to about 0.3 mm, greater than or equal to about 0.5 mm, greater than or equal to about 0.75 mm, greater than or equal to about 1 mm, greater than or equal to about 2 mm, greater than or equal to about 3 mm, greater than or equal to about 5 mm, greater than or equal to about 10 mm, greater than or equal to about 15 mm, etc. and/or less than or equal to about 30 mm, less than or equal to about 25 mm, less than or equal to about 20 mm, less than or equal to about 15 mm, less than or equal to about 12.5 mm, less than or equal to about 10 mm, less than or equal to about 7.5 mm, less than or equal to about 5 mm, etc.

The separation between the light extracting structures 130 may vary along the length of the body 103 of the lightguide 101. For example, the separation may change linearly along the length of the body 103 (e.g., from the first end 112 to the second end 114, from the first end 112 to a central portion 160, from the second end 114 to a central portion 160, etc.). In one embodiment, separation between two neighboring light extracting structures 130 may be different from a separation between two other neighboring light extracting structures.

Generally, the light extracting structures 130 may be any structure configured to extract, or redirect, light propagating along the optical axis 105 in a central output direction 131 towards, e.g., a target plane 150. More specifically, light 107 may be delivered to the first end 112 of the body 103 of the lightguide 101 by a light source and may propagate in a first direction 152, and light 107 may be delivered to the second end 114 of the body 103 of the lightguide 101 by a light source and may propagate in a second direction 154. The light 107 propagating in one or both directions 152, 154 may be redirected, reflected, or extracted, by the light extracting structures 130 in the central, or general, output direction 131 towards the target plane 150. In at least one embodiment, each light extracting structure 130 may have an extraction efficiency of less than 5%, or less than 4%, or less than 3%, or less than 2%, or less than 1.5%, or less than 1%, or less than 0.5%, where extraction efficiency of a light extracting structure refers to the ratio of the power of light extracted by the structure to the power of light within the lightguide at the structure. So for example, an extraction efficiency of 1% means that 1% of the light at the structure is extracted by the structure.

The light extracting structures 130 may be described as being notches, protrusions, and/or any other structure. As shown in FIG. 1, the light extracting structures 130 are notches located proximate (e.g., extending into) the first side 116 of the body 103 of the lightguide 101. Each of the light extracting structures 130 defines at least a first surface 132 configured to reflect light 107 traveling, or propagating, in the first direction 152 along the optical axis 105 and a second surface 134 configured to reflect light 107 traveling, or propagating, in the second direction 154 along the optical axis 105. As shown, the first and second surfaces 132, 134 may be substantially planar (e.g., lying along a plane). In other embodiments, the first and/or second surfaces 132, 134 may not be substantially planar such as, e.g., arcuate. One or both of the first and second surfaces 132, 134 may include a light reflecting layer or material that may be configured to reflect light, which may increase the reflectance of the surface. For example, the first and second surfaces 132, 134 may include a reflective metal (e.g., silver, aluminum, gold, etc.) or reflective polymer layer. The first surface 132 and/or the second surface 134 may be adapted, or configured, to extract light propagating along the optical axis from the second side 118 of the body 103 by reflecting the propagating light toward the second side 118 primarily by total internal reflection. The first and second surfaces 134, 134 may be exposed to air on the first side 116 of the body 103. In another embodiment, filler material may fill the "notches" of the light extracting structures 130 such that the first and second surfaces 132, 134 are not exposed to air.

An angle formed between the first and second surfaces 132, 134 and the optical axis 105 may provide desirable properties to mitigate the impact of material loss, and achieve illumination uniformity, less color shift and system efficiency optimization. For instance, as described herein, at least a portion (e.g., a substantial portion) of the light 107 that has propagated to the central portion 160 (e.g., the central portion 160 being located about halfway between the first end 112 and the second end 114) may be absorbed, and therefore, when the light 107 that has propagated to the central portion 160 may be less uniform and/or weaker (e.g., have less intensity or power) when redirected from the central portion 160. The angle formed between the first and second surfaces 132, 134 and the optical axis 105 may be configured to extract the light 107 out of the lightguide 101 and direct the light to the target plane 150 as soon as possible such that less light is lost to absorption. For example, the angle formed between the first and second surfaces 132, 134 may be configured to extract more light 107 out of the lightguide 101 toward the side portions 162 of the lightguide 101 but instead of directing the light 107 in a normal direction (e.g., normal to the optical axis 105), the light 107 may be directed at one or more angles to the optical axis 105 to optimize the efficiency and/or uniformity of the light pattern produced on the target plane 150.

For example, angle $\alpha$ may be defined between the first surface 132 of the light extracting structures 130 and the optical axis 105, and an angle $\beta$ may be defined between the second surface 134 of the light extracting structures 130 and the optical axis 105. More specifically, each of the first surface 132 and the second surface 134 may extend along, or be center on, a plane, and the angles $\alpha$ and $\beta$, respectively, may be defined where the plane of the first surface 132 and the second surface 134 intersects with the optical axis 105. In the words, if the surfaces 132, 134 were extended to the optical axis 105, the surfaces 132, 134 would form angles $\alpha$ and $\beta$ with the optical axis 105.

The angles $\alpha$ and $\beta$ may be selected to provide efficient illumination and uniform color pattern. For example, one or both of angles $\alpha$ and $\beta$ may be less than or equal to about 45 degrees, less than or equal to about 42.5 degrees, less than or equal to about 40 degrees, less than or equal to about 37.5 degrees, less than or equal to about 36 degrees, less than or equal to about 35 degrees, less than or equal to about 32.5 degrees, less than or equal to about 30 degrees, less than or equal to about 25 degrees, less than or equal to about 20 degrees, less than or equal to about 15 degrees, less than or equal to about 10 degrees, etc. and/or greater than or equal to about 5 degrees, greater than or equal to about 10 degrees, greater than or equal to about 15 degrees, greater than or equal to about 20 degrees, greater than or equal to about 22.5 degrees, greater than or equal to about 25 degrees, greater than or equal to about 27.5 degrees, greater than or equal to about 30 degrees, greater than or equal to about 32.5 degrees, greater than or equal to about 35 degrees, greater than or equal to about 37.5 degrees, greater than or equal to about 40 degrees, etc. In at least the embodiment shown, the angles $\alpha$ and $\beta$ for each of the light extracting structures 130 are about 36 degrees.

Further, at least one light extracting structure 130 may include surfaces 132, 134 that have different angles $\alpha$ and $\beta$ than other light extracting structures 130. In other words, one or more light extracting structures 130 may define different angles $\alpha$ and $\beta$. For example, the angles $\alpha$ and $\beta$ may vary along the length of the body 103 of the lightguide 101 (e.g., depending on the distance for the first or second end 112, 114). In one embodiment, all the light extracting structures 130 may define the same angles $\alpha$ and $\beta$.

In one or more embodiments, a certain or selected percentage of the light extracting structures 130 may have the same or similar angles α and/or β. For example, greater than or equal to about 50%, greater than or equal to about 60%, greater than or equal to about 70%, greater than or equal to about 80%, greater than or equal to about 85%, greater than or equal to about 90%, greater than or equal to about 95%, etc. of the light extracting structures in the plurality of light extracting structures, the first surface 132 may make a first angle such as angle α with the optical axis 105 that is less than 45 degrees and greater than 10 degrees.

Due to the angles α and β of the exemplary lightguide 101, light may be directed from the light sources 120 through the body 103 of the lightguide 101 and reflected, or redirect, by the light extracting structures 130 in a plurality of different directions (e.g., multiple directions not perpendicular to the optical axis 105, etc.) generally towards the target plane 150 (which, e.g., may be parallel to the optical axis 105).

When the first surface 132 and/or second surface 134 are arcuate (as opposed to planar), the angles α and β may formed by at least one plane tangent to the arcuate surface with the optical axis 105. In other words, one or more planes that are tangential to a point with the arcuate shape of the surfaces 132, 134 may be used to determine, or form, the angles α and β. For example, as shown in FIG. 1A, lighting system 100a includes at least one light extracting feature 130a in which the second surface 134a (for example) is arcuate rather than planar. As is shown in FIG. 1A, at least one plane (angled dashed line) tangent to the arcuate surface 134a creates and angle β with the optical axis 105.

Another angle, angle r may be defined between the first and the second surfaces 132, 134. Angle r may be described as the "peak" angle. The peak angle r may be in the range of about 90 degrees to about 170 degrees, about 90 degrees to about 150 degrees, about 100 degrees to about 140 degrees, about 100 degrees to about 120 degrees, etc. For example, the angle r may be greater than or equal to about 90 degrees, greater than or equal to about 95 degrees, greater than or equal to about 100 degrees, greater than or equal to about 105 degrees, greater than or equal to about 108 degrees, greater than or equal to about 115 degrees, greater than or equal to about 120 degrees, etc. and/or less than or equal to about 170 degrees, less than or equal to about 160 degrees, less than or equal to about 150 degrees, less than or equal to about 140 degrees, less than or equal to about 130 degrees, less than or equal to about 120 degrees, less than or equal to about 115 degrees, less than or equal to about 110 degrees, etc.

As described herein, the light extracting structures 130 of the lightguide 101 of FIG. 1 may be described as being "notches." More specifically, to define the notch, each of the first surface 132 and the second surface 134 may extend from the first side 116 of the body 103 of the lightguide 101 toward the optical axis 105 and into the core 109 resulting in the light extracting structure 130 being a "notch." As shown in FIG. 1, the "notch" may resemble a "V"-shaped groove. In other words, the light extracting structure 130 may have a V-shaped cross-section in a direction parallel to the optical axis 105.

As shown in FIG. 1, each of the light extracting structures 130 is a "notch." In other embodiments, one or more of the light extracting structures 130 may be "notches" while a remainder of the light extracting structures 130 may not be "notches" such as, e.g., "protrusions." An exemplary lightguide 201 including two different types of light extracting structures 230 is depicted in FIG. 3. As shown, the portion of the lightguide 201 shown includes one protrusion 234 and one notch 232. A protrusion 234 may be defined as including a first surface 236 and a second surface 238, each surface 236, 238 extending from the first side 216 of the lightguide 201 away from the optical axis 205 and a core of the lightguide 201 resulting in the light extracting structure 230 being a protrusion 234.

As shown, the protrusion 234 may operate, or function, in a substantially similar manner as the notch 232. For example, the protrusion may redirect, or reflected, light traveling, or propagating, in either direction along an optical axis 205 of the lightguide 201. The protrusion 234 may define a first surface 236 configured to direct light propagating in a first direction along the lightguide 201 out the second side 218 of the lightguide 201 and a second surface 238 configured to direct light propagating in a second direction opposite the first direction along the lightguide 201 out the second side 218 of the lightguide 201.

More specifically, the first and second surfaces 236, 238 of the protrusion 234 may define angles formed with the optical axis 205 that are substantially similar to the angles α and β described herein with respect to the first and second surfaces 132, 134 of the light extracting structures 130. For example, the first and second surfaces 236, 238 may form angle with the optical axis 205, or an axis extending parallel to the optical axis 205, that may be less than or equal to about 45 degrees and greater than or equal to about 10 degrees. In at least one embodiment, one or both of the first and second surfaces 236, 238 may form angle with the optical axis 205, or an axis extending parallel to the optical axis 205, that is about 36 degrees.

The exemplary lightguides described herein may be further described in terms of efficiency and/or color shift. For example, an exemplary lightguide may have optical absorption coefficient of at least 0.015 cm$^{-1}$ at a wavelength of 500 nm and may be adapted to receive an incident light having a first power (e.g., measured in lumens, watts, etc.) and an $x_1$ color coordinate in a range from 0.2 to 0.4 and a $y_1$ color coordinate in a range from 0.1 to 0.4 from an input face of the lightguide. The received light may propagate within the lightguide in a first direction along the optical axis and may be extracted by the plurality of discrete light extracting structures exiting the lightguide from a second side as an output light having a second power (e.g., measured in lumens, watts, etc.) and $(x_2, y_2)$ color coordinates. A ratio of the second power to the first power may be greater than or equal to about 5%, greater than or equal to about 10%, greater than or equal to about 15%, greater than or equal to about 20%, greater than or equal to about 25%, greater than or equal to about 30%, greater than or equal to about 35%, greater than or equal to about 40%, greater than or equal to about 45%, greater than or equal to about 50%, greater than or equal to about 55%, greater than or equal to about 60%, greater than or equal to about 65%, greater than or equal to about 70%, etc. and/or less than or equal to about 80%, less than or equal to about 75%, less than or equal to about 70%, less than or equal to about 65%, less than or equal to about 60%, less than or equal to about 55%, less than or equal to about 50%, less than or equal to about 45%, less than or equal to about 40%, less than or equal to about 35%, less than or equal to about 30%, less than or equal to about 25%, less than or equal to about 20%, less than or equal to about 15%, etc. Further, an absolute value of a difference between $x_1$ and $x_2$ may be no more, or greater, than 0.03 and an absolute value of a difference between $y_1$ and $y_2$ may be no more, or greater, than 0.05.

The exemplary lightguides may be configured, or adapted, to receive incident light (e.g., from the light sources 102) having an $x_1$ color coordinate in a range from about 0.25 to about 0.35, from about 0.28 to about 0.32, etc. The exemplary lightguides may be configured, or adapted, to receive incident light (e.g., from the light sources 102) having an $y_1$ color coordinate in a range from about 0.15 to about 0.35, about 0.2 to about 0.3, etc. The absolute value of a difference between $x_1$ and $x_2$ may be less than or equal to about 0.04, less than or equal to about 0.03, less than or equal to about 0.02, less than or equal to about 0.01, etc. and/or greater than or equal to about 0.005, greater than or equal to about 0.01, greater than or equal to about 0.015, greater than or equal to about 0.025, etc. The absolute value of a difference between $y_1$ and $y_2$ may be less than or equal to about 0.05, less than or equal to about 0.04, less than or equal to about 0.03, less than or equal to about 0.02, etc. and/or greater than or equal to about 0.01, greater than or equal to about 0.02, greater than or equal to about 0.03, etc.

Further, the light output by the exemplary lightguides may be described in terms of an intensity profile. The intensity profile may lie in a plane that includes, or comprises, the optical axis 105 and the central output direction 131. The intensity profile may have a peak at substantially a center of the intensity profile. Further, the exemplary lightguides may have a ratio of a full width at half maximum (FWHM) of the intensity profile to the active length that is at least 50%.

EXAMPLE

A simulation was carried out to demonstrate the illumination improvement using new notch, or protrusion, angles (e.g., angles α and β described herein with reference to FIG. 1). Light from two LEDs (e.g., ultra white (blue-tint) color) was coupled to two end surfaces of a 1200 mm long precision lighting element (PLE) fiber. The PLE fiber had a 7 mm diameter and mushroom profile and included 670 notches. The simulation compares illumination output with notch angles at 120, 108, 90, 80, and 70 degrees with other parameters such as, e.g., notch depth, notch spacing, etc. are kept constant.

Table 1 depicts the results. More specifically, Table 1 includes the notch angle, measured colored shift along the x coordinate, measured colored shift along the y coordinate, total output efficiency (normalized to the 108 degree example), and peak irradiance (normalized to the 108 degree example).

TABLE 1

| Notch Angle | Efficiency (normalized) | Peak Lux (normalized) | ΔCx | ΔCy |
|---|---|---|---|---|
| 70 | 55% | 40% | 0.0417 | 0.1283 |
| 80 | 64% | 46% | 0.0323 | 0.0994 |
| 90 | 80% | 61% | 0.0313 | 0.0964 |
| 108 | 100% | 100% | 0.0081 | 0.0249 |
| 120 | 95% | 123% | −0.0001 | −0.0004 |

As can been seen in Table 1, the simulated lightguide having a notch, or peak, angle of 108 degrees (e.g., angles α and β both being 36 degrees) showed the highest total output efficiency and high peak irradiance. The color shift between the edge portion and center portion may be much reduced when compared to the 70, 80, and 90 degree examples.

Figure 4A:
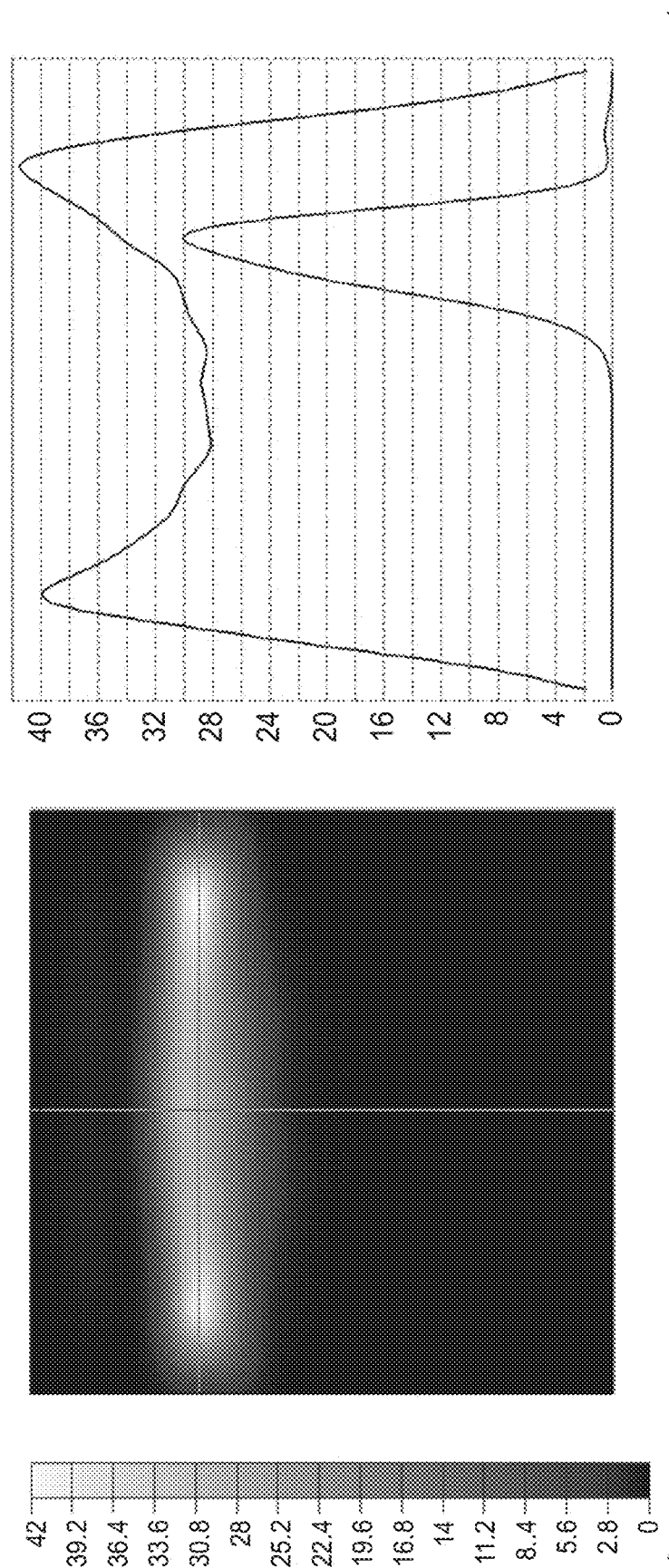
FIGS. 4A-4E depict experimental results for a plurality of simulated lightguides.
Figure 4B:
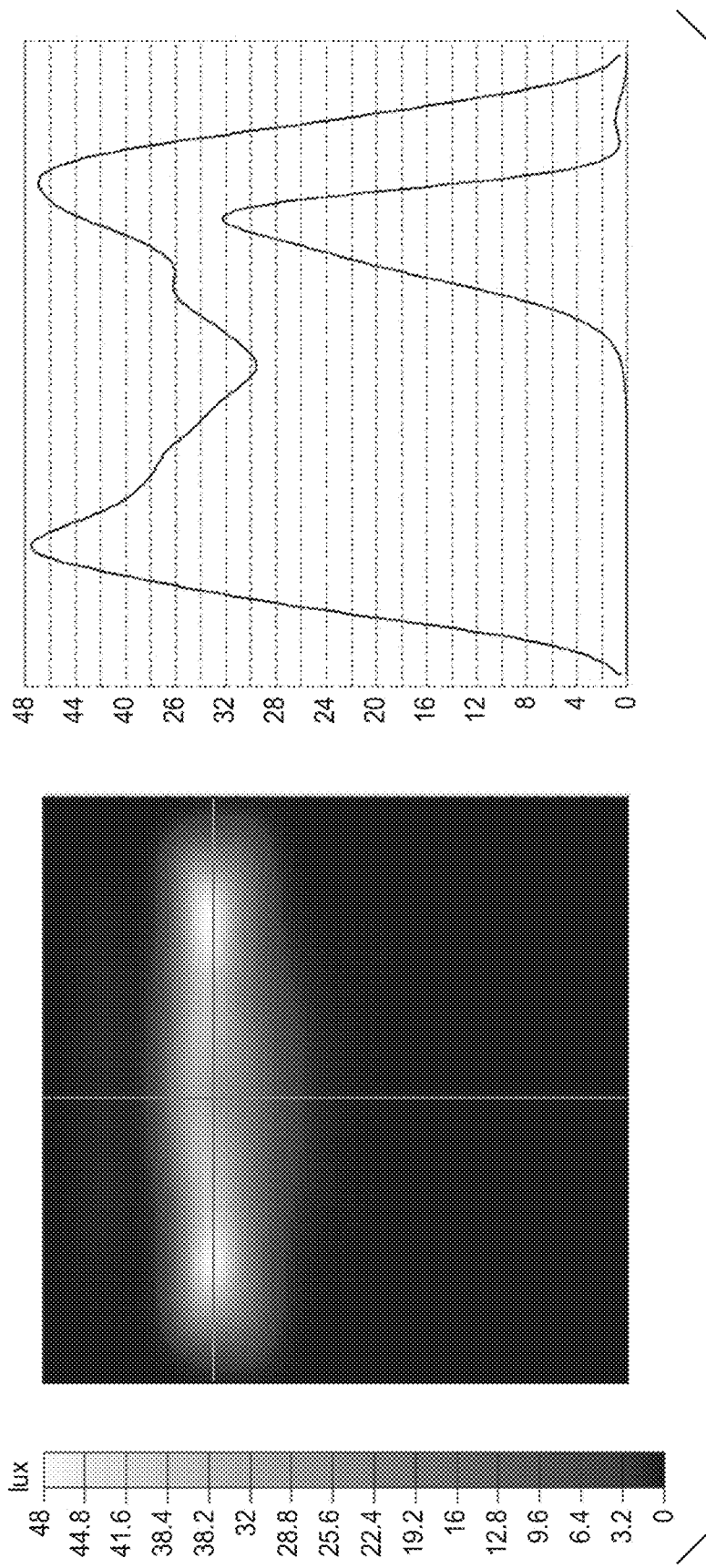
Figure 4C:
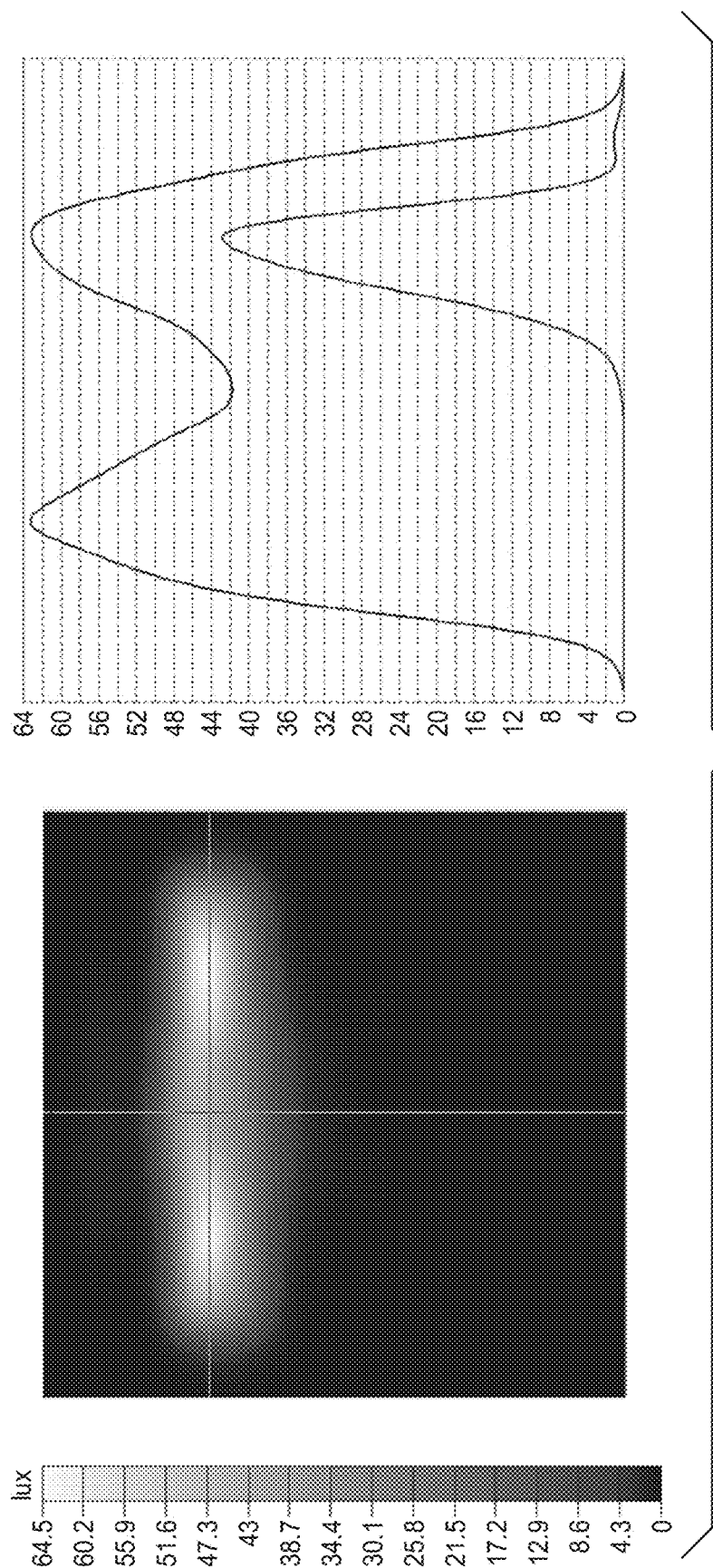
Figure 4D:
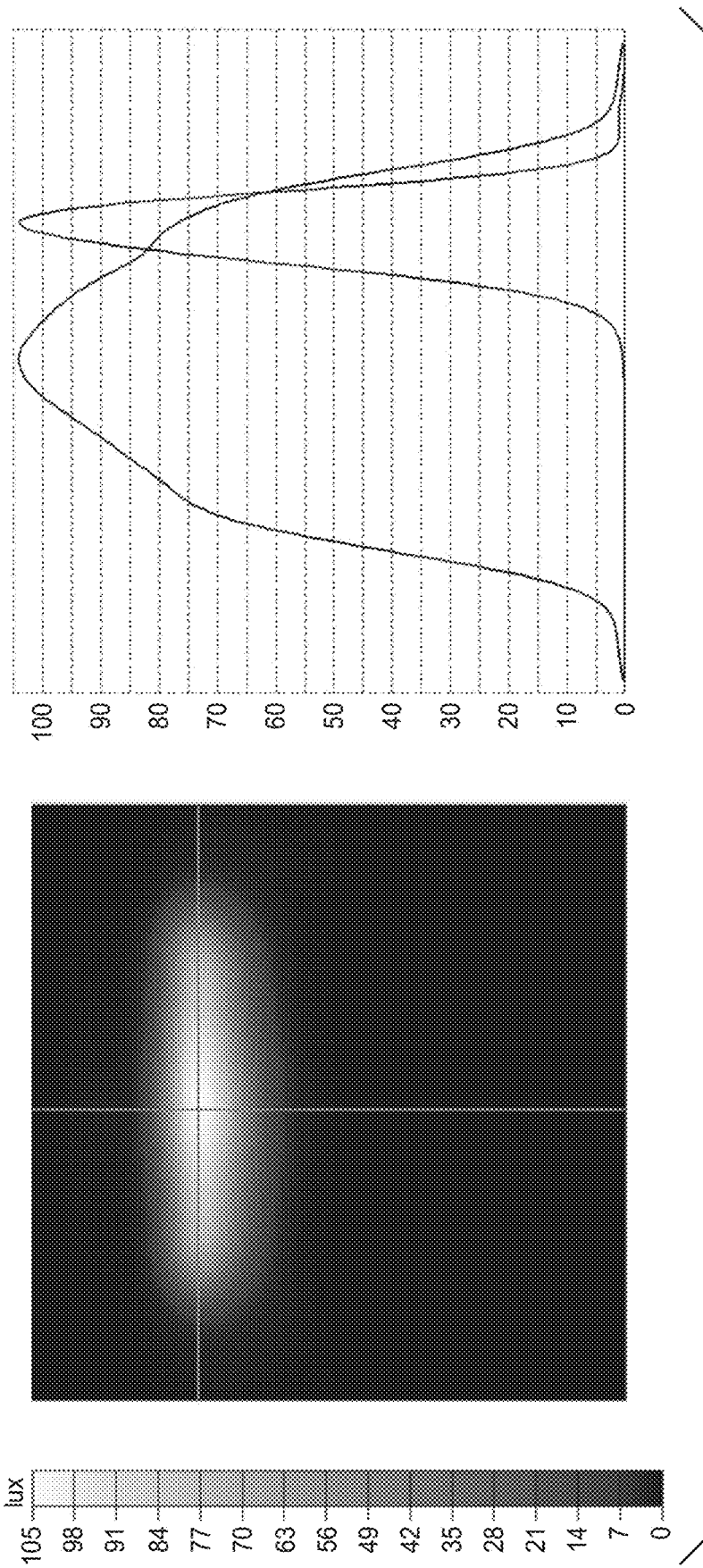
Figure 4E:
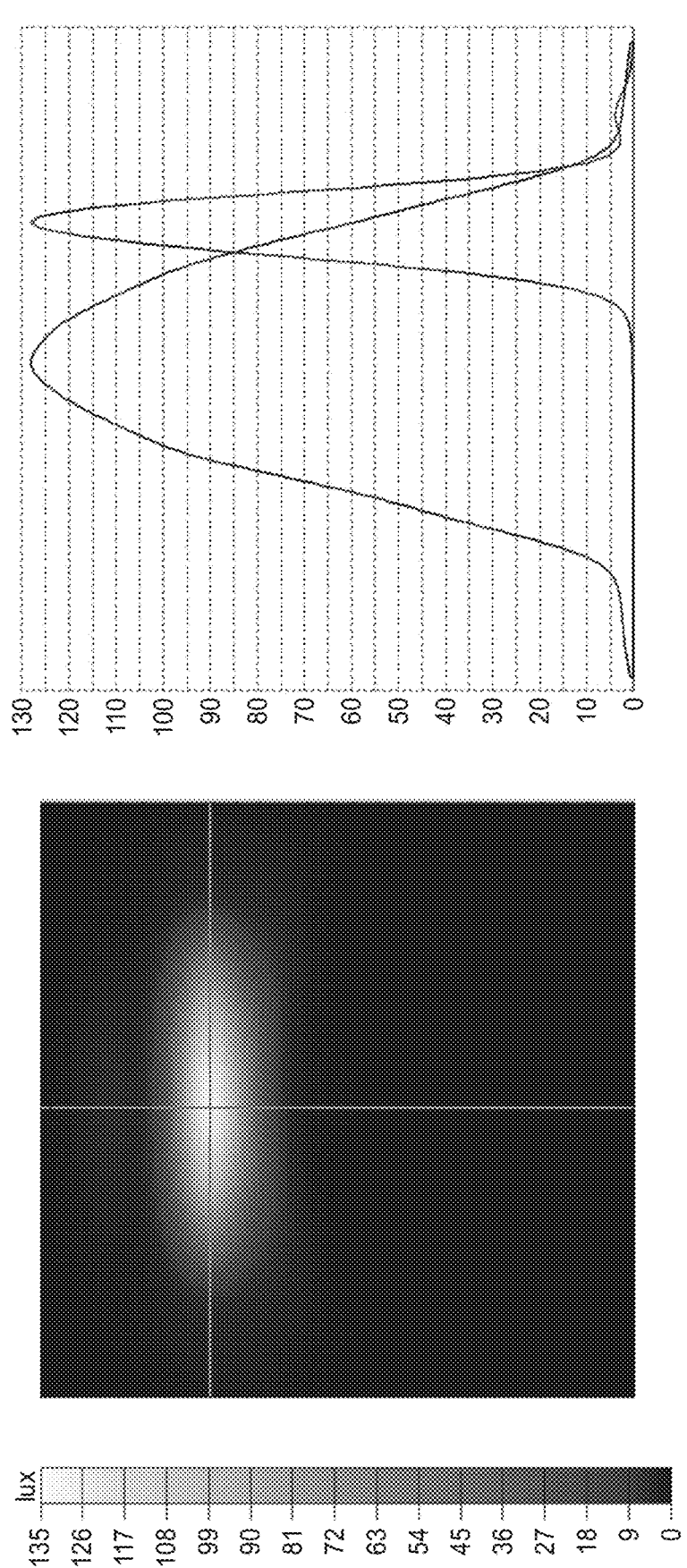

FIGS. 4A-4E depict experimental results for the simulated lightguides. More specifically, FIGS. 4A-4E depict total illuminance maps for incident flux and graphs plotting the lux taken across the axes of the map. A simulated lightguide having a notch angle of 70 degrees (e.g., angles α and β both being 55 degrees) is depicted in FIG. 4A, a simulated lightguide having a notch angle of 80 degrees (e.g., angles α and 13 both being 50 degrees) is depicted in FIG. 4B, a simulated lightguide having a notch angle of 90 degrees (e.g., angles α and β both being 45 degrees) is depicted in FIG. 4C, a simulated lightguide having a notch angle of 108 degrees (e.g., angles α and β both being 36 degrees) is depicted in FIG. 4D, and a simulated lightguide having a notch angle of 120 degrees (e.g., angles α and β both being 30 degrees) is depicted in FIG. 4E.

The peak irradiance for the simulated lighting guide having a notch angle of 70 degrees was 42 Lux. The peak irradiance for the simulated lighting guide having a notch angle of 80 degrees was 48 Lux. The peak irradiance for the simulated lighting guide having a notch angle of 90 degrees was 63 Lux. The peak irradiance for the simulated lighting guide having a notch angle of 108 degrees was 105 Lux. The peak irradiance for the simulated lighting guide having a notch angle of 120 degrees was 128 Lux.

As can be seen, the 108 degree notch design shows good center illumination and has the best system efficiency. The color shift of the light pattern (between the edge portions and the center portion) is reduced in 108 degree notch angle example and 120 degree notch angle example when compared to the 70, 80, and 90 degree notch angle examples.

Thus, embodiments of LIGHTGUIDES are disclosed. One skilled in the art will appreciate that the compositions described herein can be practiced with embodiments other than those disclosed. The disclosed embodiments are presented for purposes of illustration and not limitation.

The following are a list of embodiments of the present disclosure:

Embodiment 1 is a lightguide centered on an optical axis and comprising a plurality of discrete light extracting structures next to and spaced apart from each other, each light extracting structure comprising a first surface extending from a first side of the lightguide and being adapted to extract light propagating in a first direction along the optical axis from an opposite second side of the lightguide by reflecting the propagating light toward the second side, the first surface making a first angle with the optical axis that is less than 45 degrees and greater than 10 degrees.

Embodiment 2 is the lightguide of embodiment 1, wherein for at least one discrete light extracting structure, the first surface extends from the first side of the lightguide toward the optical axis and into a core of the lightguide resulting in the light extracting structure comprising a notch.

Embodiment 3 is the lightguide of any one of embodiments 1-2, wherein for at least one discrete light extracting structure, the first surface extends from the first side of the lightguide away from the optical axis and a core of the lightguide resulting in the light extracting structure comprising a protrusion.

Embodiment 4 is the lightguide of any one of embodiments 1-3, wherein at least one discrete light extracting structure in the plurality of discrete light extracting structures comprises a notch and at least one other discrete light extracting structure in the plurality of discrete light extracting structures comprises a protrusion.

Embodiment 5 is the lightguide of embodiment 1, wherein each discrete light extracting structure in the plurality of discrete light extracting structures comprises a notch.

Embodiment 6 is the lightguide of embodiment 1, wherein each discrete light extracting structure in the plurality of discrete light extracting structures comprises a protrusion.

Embodiment 7 is the lightguide of any one of embodiments 1-6, having a round, oval, square, or rectangular cross-section in a direction perpendicular to the optical axis.

Embodiment 8 is the lightguide of any one of embodiments 1-6, having a mushroom shape cross-section in a direction perpendicular to the optical axis, the mushroom comprising a top portion disposed on a bottom portion, the top portion being narrower and comprising the first side and the light extracting structures of the lightguide, the bottom portion being wider and comprising the opposite second side of the lightguide.

Embodiment 9 is the lightguide of embodiment 8, wherein the top portion comprises two opposing substantially parallel planar sides.

Embodiment 10 is the lightguide of any one of embodiments 1-9, wherein the first side comprises an arcuate first surface and the second side comprises an arcuate second surface.

Embodiment 11 is the lightguide of any one of embodiments 1-10, further comprising:
opposing third sides, each third side extending inwardly from a corresponding outer edge of the second side; and
opposing fourth sides, each fourth side extending from an inner edge of a corresponding third side to an outer edge of the first side.

Embodiment 12 is the lightguide of embodiment 11, wherein the opposing fourth sides are substantially parallel to each other.

Embodiment 13 is the lightguide of any one of embodiments 11-12, wherein the opposing fourth sides are substantially planar.

Embodiment 14 is the lightguide of any one of embodiments 1-13, further comprising a plane of symmetry that comprises the optical axis.

Embodiment 15 is the lightguide of any one of embodiments 1-14 being flexible.

Embodiment 16 is the lightguide of any one of embodiments 1-14 being rigid.

Embodiment 17 is the lightguide of any one of claims 1-16 having an active length defined as a distance between a first light extracting structure closest to an input face of the lightguide and a last light extracting structure farthest from the input face, the active length being at least 200 mm.

Embodiment 18 is the lightguide of embodiment 17, wherein the active length is at least 500 mm.

Embodiment 19 is the lightguide of embodiment 17, wherein the active length is at least 1000 mm.

Embodiment 20 is the lightguide of embodiment 17, wherein the active length is at least 2 meters.

Embodiment 21 is the lightguide of embodiment 17, wherein the active length is at least 3 meters.

Embodiment 22 is the lightguide of embodiment 17, wherein the active length is at least 5 meters.

Embodiment 23 is the lightguide of embodiment 17, wherein the active length is at least 10 meters.

Embodiment 24 is the lightguide of any one of embodiments 1-23 embodiment being at least 500 mm long.

Embodiment 25 is the lightguide of any one of embodiments 1-23 embodiment being at least 1 meter long.

Embodiment 26 is the lightguide of any one of embodiments 1-23 being at least 2 meters long.

Embodiment 27 is the lightguide of any one of embodiments 1-23 being at least 5 meters long.

Embodiment 28 is the lightguide of any one of embodiments 1-23 being at least 10 meters long.

Embodiment 29 is the lightguide of any one of embodiments 1-28 having a core having an index of refraction in a range from 1.3 to 1.65.

Embodiment 30 is the lightguide of any one of embodiments 1-29 having a core having an index of refraction in a range from 1.4 to 1.6.

Embodiment 31 is the lightguide of any one of embodiments 1-30 having a core having an index of refraction in a range from 1.5 to 1.6.

Embodiment 32 is the lightguide of any one of embodiments 1-31 having a core having an index of refraction in a range from 1.5 to 1.55.

Embodiment 33 is the lightguide of any one of embodiments 2-3 and 29-32 having a cladding surrounding the core.

Embodiment 34 is the lightguide of embodiment 33, wherein the cladding comprises a metal.

Embodiment 35 is the lightguide of embodiment 33, wherein the cladding has an index of refraction in a range from 1 to 1.6.

Embodiment 36 is the lightguide of embodiment 33, wherein the cladding has an index of refraction in a range from 1 to 1.5.

Embodiment 37 is the lightguide of claim 33, wherein the cladding has an index of refraction in a range from 1 to 1.4.

Embodiment 38 is the lightguide of embodiment 33, wherein the cladding has an index of refraction in a range from 1 to 1.3.

Embodiment 39 is the lightguide of embodiment 33, wherein the cladding has an index of refraction in a range from 1 to 1.2.

Embodiment 40 is the lightguide of any one of embodiments 1-39 having an optical absorption coefficient at a wavelength of 500 nm that is at least 0.01 $cm^{-1}$.

Embodiment 41 is the lightguide of any one of embodiments 1-39 having an optical absorption coefficient at a wavelength of 500 nm that is at least 0.015 $cm^{-1}$.

Embodiment 42 is the lightguide of any one of embodiments 1-39 having an optical absorption coefficient at a wavelength of 500 nm that is at least 0.018 $cm^{-1}$.

Embodiment 43 is the lightguide of any one of embodiments 1-39 having an optical absorption coefficient at a wavelength of 500 nm that is at least 0.019 $cm^{-1}$.

Embodiment 44 is the lightguide of any one of embodiments 1-39 having an optical absorption coefficient at a wavelength of 500 nm that is at least 0.02 $cm^{-1}$.

Embodiment 45 is the lightguide of any one of embodiments 1-39 having an optical absorption coefficient at a wavelength of 500 nm that is at least 0.025 $cm^{-1}$.

Embodiment 46 is the lightguide of any one of embodiments 1-39 having an optical absorption coefficient at a wavelength of 500 nm that is at least 0.03 $cm^{-1}$.

Embodiment 47 is the lightguide of any one of embodiments 1-46, wherein light propagates along the first direction along the optical axis by total internal reflection.

Embodiment 48 is the lightguide of any one of embodiments 1-47, having an optically homogenous core.

Embodiment 49 is the lightguide of any one of embodiments 1-48 having an optical absorption coefficient $\theta$ at 500 nm, and an active length d defined as a distance between a first light extracting structure closest to an input face of the lightguide and a last light extracting structure farthest from the input face, wherein $\theta \cdot d$ is at least 1.

Embodiment 50 is the lightguide of embodiment 49, wherein $\theta \cdot d$ is at least 1.5.

Embodiment 51 is the lightguide of embodiment 49, wherein $\theta \cdot d$ is at least 2.

Embodiment 52 is the lightguide of embodiment 49, wherein θ·d is at least 2.5.

Embodiment 53 is the lightguide of embodiment 49, wherein θ·d is at least 3.

Embodiment 54 is the lightguide of any one of embodiments 1-53, wherein the first surface of at least one light extracting structure comprises a light reflecting layer for increasing a reflectance of the first surface.

Embodiment 55 is the lightguide of any one of embodiments 1-54, wherein the first surface of at least one light extracting structure is exposed to air.

Embodiment 56 is the lightguide of any one of embodiments 1-55, wherein the first surface of each light extracting structure is substantially planar.

Embodiment 57 is the lightguide of any one of embodiments 1-55, wherein the first surface of at least one light extracting structure comprises an arcuate surface, wherein at least one plane tangent to the arcuate surface makes a first angle with the optical axis that is less than 45 degrees and greater than 10 degrees.

Embodiment 58 is the lightguide of any one of embodiments 1-57, wherein at least two light extracting structures in the plurality of discrete spaced apart light extracting structures have different associated first angles.

Embodiment 59 is the lightguide of any one of embodiments 1-58, wherein the first angle is less than 45 degrees and greater than 20 degrees.

Embodiment 60 is the lightguide any one of embodiments 1-59, wherein the first angle is less than 45 degrees and greater than 30 degrees.

Embodiment 61 is the lightguide any one of embodiments 1-60, wherein the first angle is less than 40 degrees and greater than 30 degrees.

Embodiment 62 is the lightguide of any one of embodiments 1-61, wherein each light extracting structure further comprises a second surface extending from the first side of the lightguide and being adapted to extract light propagating in a second direction, opposite the first direction, along the optical axis from the second side of the lightguide by reflecting the propagating light toward the second side, the second surface making a second angle with the optical axis that is less than 45 degrees and greater than 10 degrees.

Embodiment 63 is the lightguide of embodiment 62, wherein for at least one discrete light extracting structure, the second surface extends from the first side of the lightguide toward the optical axis and into a core of the lightguide resulting in the light extracting structure comprising a notch.

Embodiment 64 is the lightguide of any one of embodiments 62-63, wherein for at least one discrete light extracting structure, the second surface extends from the first side of the lightguide away from the optical axis and a core of the lightguide resulting in the light extracting structure comprising a protrusion.

Embodiment 65 is the lightguide of any one of embodiments 62-64, wherein at least one discrete light extracting structure in the plurality of discrete light extracting structures comprises a notch and at least one other discrete light extracting structure in the plurality of discrete light extracting structures comprises a protrusion.

Embodiment 66 is the lightguide of embodiment 62, wherein each discrete light extracting structure in the plurality of discrete light extracting structures comprises a notch.

Embodiment 67 is the lightguide of embodiment 62, wherein each discrete light extracting structure in the plurality of discrete light extracting structures comprises a protrusion.

Embodiment 68 is the lightguide of any one of embodiments 62-67, wherein the second angle is less than 45 degrees and greater than 20 degrees.

Embodiment 69 is the lightguide of any one of embodiments 62-68, wherein the second angle is less than 45 degrees and greater than 30 degrees.

Embodiment 70 is the lightguide of any one of embodiments 62-69, wherein the second angle is less than 40 degrees and greater than 30 degrees.

Embodiment 71 is the lightguide of any one of embodiments 62-70, wherein the second angle is different from the first angle.

Embodiment 72 is the lightguide of any one of embodiments 62-71, wherein the second surface of each light extracting structure is substantially planar.

Embodiment 73 is the lightguide of any one of embodiments 62-71, wherein the second surface of at least one light extracting structure comprises an arcuate surface, wherein at least one plane tangent to the arcuate surface makes a second angle with the optical axis that is less than 45 degrees and greater than 10 degrees.

Embodiment 74 is the lightguide of any one of embodiments 62-73, wherein the first and second surfaces of each light extracting structure intersect at a linear peak having a peak angle that is greater than 90 degrees and less than 150 degrees.

Embodiment 75 is the lightguide of embodiment 74, wherein the peak angle is greater than 100 degrees and less than 140 degrees.

Embodiment 76 is the lightguide of embodiment 74, wherein the peak angle is greater than 100 degrees and less than 120 degrees.

Embodiment 77 is the lightguide of any one of embodiments 1-76, wherein at least one light extracting structure comprises a V-shaped cross-section in a direction parallel to the optical axis.

Embodiment 78 is the lightguide of any one of embodiments 1-77, wherein the first surface of each light extracting structure is adapted to extract light propagating in the first direction along the optical axis from the second side of the lightguide by reflecting the propagating light toward the second side primarily by total internal reflection.

Embodiment 79 is the lightguide of any one of embodiments 1-78, wherein a separation between two neighboring light extracting structures changes linearly across the plurality of discrete light extracting structures.

Embodiment 80 is the lightguide of any one of embodiments 1-78, wherein a separation between two neighboring light extracting structures is different from a separation between two other neighboring light extracting structures.

Embodiment 81 is the lightguide of any one of embodiments 1-80, wherein a separation between each two neighboring light extracting structures is in a range from 0.5 mm to 10 mm.

Embodiment 82 is the lightguide of any of embodiments 1-39 and 47-81 having an optical absorption coefficient of at least 0.015 cm$^{-1}$ at a wavelength of 500 nm and being adapted to receive an incident light having a first power and an $x_1$ color coordinate in a range from 0.2 to 0.4 and a $y_1$ color coordinate in a range from 0.1 to 0.4 from an input face of the lightguide, the received light propagating within the lightguide in the first direction along the optical axis and being extracted by the plurality of discrete light extracting structures and exiting the lightguide from the second side as an output light having a second power and ($x_2$, $y_2$) color coordinates, a ratio of the second power to the first power being at least 10%, an absolute value of a difference between $x_1$ and $x_2$ being no more than 0.03 and an absolute value of a difference between $y_1$ and $y_2$ being no more than 0.05.

Embodiment 83 is the lightguide of embodiment 82 having an optical absorption coefficient of at least 0.019 $cm^{-1}$ at a wavelength of 500 nm.

Embodiment 84 is the lightguide of any one of embodiments 82-83 being adapted to receive an incident light having an $x_1$ color coordinate in a range from 0.25 to 0.35 from the input face of the lightguide.

Embodiment 85 is the lightguide of any one of embodiments 82-84 being adapted to receive an incident light having an $x_1$ color coordinate in a range from 0.28 to 0.32 from the input face of the lightguide.

Embodiment 86 is the lightguide of any one of embodiments 82-85 being adapted to receive an incident light having an $y_1$ color coordinate in a range from 0.15 to 0.35 from the input face of the lightguide.

Embodiment 87 is the lightguide of any one of embodiments 82-86 being adapted to receive an incident light having an $y_1$ color coordinate in a range from 0.2 to 0.3 from the input face of the lightguide.

Embodiment 88 is the lightguide of any one of embodiments 82-83 being adapted to receive an incident light having an $x_1$ color coordinate in a range from 0.25 to 0.35 and a $y_1$ color coordinate in a range from 0.15 to 0.35 from the input face of the lightguide.

Embodiment 89 is the lightguide of any one of embodiments 82-88, wherein the absolute value of the difference between $x_1$ and $x_2$ is no more than 0.02.

Embodiment 90 is the lightguide of any one of embodiments 82-89, wherein the absolute value of the difference between $x_1$ and $x_2$ is no more than 0.01.

Embodiment 91 is the lightguide of any one of embodiments 82-90, wherein the absolute value of the difference between $y_1$ and $y_2$ is no more than 0.04.

Embodiment 92 is the lightguide of any one of embodiments 82-91, wherein the absolute value of the difference between $y_1$ and $y_2$ is no more than 0.03.

Embodiment 93 is the lightguide of any one of embodiments 82-92, wherein the absolute value of the difference between $y_1$ and $y_2$ is no more than 0.02.

Embodiment 94 is the lightguide of any one of embodiments 82-93, wherein the ratio of the second power to the first power is at least 15%.

Embodiment 95 is the lightguide of any one of embodiments 82-94, wherein the ratio of the second power to the first power is at least 20%.

Embodiment 96 is the lightguide of any one of embodiments 82-95, wherein the ratio of the second power to the first power is at least 30%.

Embodiment 97 is the lightguide of any one of embodiments 82-96, wherein the ratio of the second power to the first power is at least 40%.

Embodiment 98 is the lightguide of any one of embodiments 82-97, wherein the ratio of the second power to the first power is at least 50%.

Embodiment 99 is a lighting system comprising:
a light source adapted to emit light having a first power and an $x_1$ color coordinate in a range from 0.2 to 0.4 and a $y_1$ color coordinate in a range from 0.1 to 0.4; and
the lightguide of any of embodiments 1-39 and 47-81 comprising:

an optical absorption coefficient of at least 0.015 $cm^{-1}$ at a wavelength of 500 nm; and
an input face for receiving light emitted by the light source, the received light propagating within the lightguide in the first direction along the optical axis and being extracted by the plurality of discrete light extracting structures and exiting the lightguide from the second side as an output light having a second power and ($x_2$, $y_2$) color coordinates, a ratio of the second power to the first power being at least 10%, an absolute value of a difference between $x_1$ and $x_2$ being no more than 0.03 and an absolute value of a difference between $y_1$ and $y_2$ being no more than 0.05.

Embodiment 100 is the lightguide of any of embodiments 1-99 being adapted to receive an incident light having a first power from an input face of the lightguide, the received light propagating within the lightguide in the first direction along the optical axis and being extracted by the plurality of discrete light extracting structures and exiting the lightguide from the second side as an output light propagating along a central output direction and having a second power, a ratio of the second power to the first power being at least 10%, the output light having an intensity profile in a plane that comprises the optical axis and the central output direction, the intensity profile having a peak at substantially a center of the intensity profile.

Embodiment 101 is the lightguide of embodiment 100, wherein the ratio of the second power to the first power is at least 20%.

Embodiment 102 is the lightguide of embodiment 100, wherein the ratio of the second power to the first power is at least 30%.

Embodiment 103 is the lightguide of embodiment 100, wherein the ratio of the second power to the first power is at least 40%.

Embodiment 104 is the lightguide of embodiment 100, wherein the ratio of the second power to the first power is at least 50%.

Embodiment 105 is the lightguide of any one of embodiments 101-104 having an active length defined as a distance between a first light extracting structure closest to the input face of the lightguide and a last light extracting structure farthest from the input face, wherein a ratio of a full width at half maximum (FWHM) of the intensity profile to the active length is at least 0.5.

Embodiment 106 is the lightguide of embodiment 105, wherein the ratio of the FWHM of the intensity profile to the active length is at least 1.

Embodiment 107 is the lightguide of embodiment 105, wherein the ratio of the FWHM of the intensity profile to the active length is at least 2.

Embodiment 108 is the lightguide of embodiment 105, wherein the ratio of the FWHM of the intensity profile to the active length is at least 3.

Embodiment 109 is the lightguide of embodiment 105, wherein the ratio of the FWHM of the intensity profile to the active length is at least 4.

Embodiment 110 is the lightguide of embodiment 105, wherein the ratio of the FWHM of the intensity profile to the active length is at least 5.

Embodiment 111 is a lightguide comprising a plurality of discrete spaced apart light extracting structures, the lightguide having an optical absorption coefficient of at least 0.01 $cm^{-1}$ at a wavelength of 500 nm, each light extracting structure being adapted to extract light propagating within the lightguide by total internal reflection, each light extracting structure having an extraction efficiency of less than 5%, or less than 4%, or less than 3%, or less than 2%, or less than 1.5%, or less than 1%, or less than 0.5%, the lightguide being adapted to receive an incident light having a first power and an $x_1$ color coordinate in a range from 0.2 to 0.4 and a $y_1$ color coordinate in a range from 0.1 to 0.4 from an input face of the lightguide, the received light propagating within the lightguide by total internal reflection and being extracted by the plurality of discrete light extracting structures and exiting the lightguide as an output light having a second power and $(x_2, y_2)$ color coordinates, a ratio of the second power to the first power being at least 10%, an absolute value of a difference between $x_1$ and $x_2$ being no more than 0.03 and an absolute value of a difference between $y_1$ and $y_2$ being no more than 0.05.

Embodiment 112 is the lightguide of embodiment 111 having an optical absorption coefficient of at least 0.015 cm$^{-1}$ at a wavelength of 500 nm.

Embodiment 113 is the lightguide of embodiment 111 having an optical absorption coefficient of at least 0.018 cm$^{-1}$ at a wavelength of 500 nm.

Embodiment 114 is the lightguide of embodiment 111 having an optical absorption coefficient of at least 0.019 cm$^{-1}$ at a wavelength of 500 nm.

Embodiment 115 is the lightguide of embodiment 111 having an optical absorption coefficient of at least 0.02 cm$^{-1}$ at a wavelength of 500 nm.

Embodiment 116 is the lightguide of embodiment 111 having an optical absorption coefficient of at least 0.025 cm$^{-1}$ at a wavelength of 500 nm.

Embodiment 117 is the lightguide of embodiment 111 having an optical absorption coefficient of at least 0.03 cm$^{-1}$ at a wavelength of 500 nm.

Embodiment 118 is the lightguide of any of embodiments 111-117 being adapted to receive an incident light having an $x_1$ color coordinate in a range from 0.25 to 0.35.

Embodiment 119 is the lightguide of any of embodiments 111-117 being adapted to receive an incident light having an $x_1$ color coordinate in a range from 0.28 to 0.32.

Embodiment 120 is the lightguide of any of embodiments 111-119 being adapted to receive an incident light having an $y_1$ color coordinate in a range from 0.15 to 0.35.

Embodiment 121 is the lightguide of any of embodiments 111-119 being adapted to receive an incident light having an $y_1$ color coordinate in a range from 0.2 to 0.3.

Embodiment 122 is the lightguide of any of embodiments 111-121, wherein the ratio of the second power to the first power is at least 15%.

Embodiment 123 is the lightguide of any of embodiments 111-121, wherein the ratio of the second power to the first power is at least 20%.

Embodiment 124 is the lightguide of any of embodiments 111-121, wherein the ratio of the second power to the first power is at least 30%.

Embodiment 125 is the lightguide of any of embodiments 111-121, wherein the ratio of the second power to the first power is at least 40%.

Embodiment 126 is the lightguide of any of embodiments 111-121, wherein the ratio of the second power to the first power is at least 50%.

Embodiment 127 is the lightguide of any of embodiments 111-125, wherein the absolute value of the difference between $x_1$ and $x_2$ is no more than 0.02.

Embodiment 128 is the lightguide of any of embodiments 111-125, wherein the absolute value of the difference between $x_1$ and $x_2$ is no more than 0.01.

Embodiment 129 is the lightguide of any of embodiments 111-127, wherein the absolute value of the difference between $y_1$ and $y_2$ is no more than 0.04.

Embodiment 130 is the lightguide of any of embodiments 111-127, wherein the absolute value of the difference between $y_1$ and $y_2$ is no more than 0.03.

Embodiment 131 is the lightguide of any of embodiments 111-127, wherein the absolute value of the difference between $y_1$ and $y_2$ is no more than 0.02.

Embodiment 132 is a lightguide centered on an optical axis and comprising a plurality of discrete light extracting structures, each light extracting structure comprising a first surface extending from a first side of the lightguide and being adapted to extract light propagating in a first direction along the optical axis from an opposite second side of the lightguide by reflecting the propagating light toward the second side, wherein for each of at least 50% of the light extracting structures in the plurality of light extracting structures, the first surface makes a first angle with the optical axis that is less than 45 degrees and greater than 10 degrees.

Embodiment 133 is the lightguide of embodiment 131, wherein for each of at least 60% of the light extracting structures in the plurality of light extracting structures, the first surface makes a first angle with the optical axis that is less than 45 degrees and greater than 10 degrees.

Embodiment 134 is the lightguide of embodiment 131, wherein for each of at least 70% of the light extracting structures in the plurality of light extracting structures, the first surface makes a first angle with the optical axis that is less than 45 degrees and greater than 10 degrees.

Embodiment 135 is the lightguide of embodiment 131, wherein for each of at least 80% of the light extracting structures in the plurality of light extracting structures, the first surface makes a first angle with the optical axis that is less than 45 degrees and greater than 10 degrees.

Embodiment 136 is the lightguide of embodiment 131, wherein for each of at least 90% of the light extracting structures in the plurality of light extracting structures, the first surface makes a first angle with the optical axis that is less than 45 degrees and greater than 10 degrees.

Embodiment 137 is the lightguide of embodiment 131, wherein for each of at least 95% of the light extracting structures in the plurality of light extracting structures, the first surface makes a first angle with the optical axis that is less than 45 degrees and greater than 10 degrees.

Embodiment 138 is the lightguide of any one of embodiments 131-136, wherein each light extracting structure further comprises a second surface extending from the first side of the lightguide and being adapted to extract light propagating in a second direction, opposite the first direction, along the optical axis from the second side of the lightguide by reflecting the propagating light toward the second side, wherein for each of at least 50% of the light extracting structures in the plurality of light extracting structures, the second surface makes a second angle with the optical axis that is less than 45 degrees and greater than 10 degrees.

Embodiment 139 is the lightguide of embodiment 137, wherein for each of at least 60% of the light extracting structures in the plurality of light extracting structures, the second surface makes a second angle with the optical axis that is less than 45 degrees and greater than 10 degrees.

Embodiment 140 is the lightguide of embodiment 137, wherein for each of at least 70% of the light extracting structures in the plurality of light extracting structures, the second surface makes a second angle with the optical axis that is less than 45 degrees and greater than 10 degrees.

Embodiment 141 is the lightguide of embodiment 137, wherein for each of at least 80% of the light extracting structures in the plurality of light extracting structures, the second surface makes a second angle with the optical axis that is less than 45 degrees and greater than 10 degrees.

Embodiment 142 is the lightguide of embodiment 137, wherein for each of at least 90% of the light extracting structures in the plurality of light extracting structures, the second surface makes a second angle with the optical axis that is less than 45 degrees and greater than 10 degrees.

Embodiment 143 is the lightguide of embodiment 137, wherein for each of at least 95% of the light extracting structures in the plurality of light extracting structures, the second surface makes a second angle with the optical axis that is less than 45 degrees and greater than 10 degrees.

Embodiment 144 is the lightguide of embodiment 11, wherein an oblique angle between the opposing third sides is in a range from 90 degrees to 180 degrees.

Embodiment 145 is the lightguide of embodiment 11, wherein an oblique angle between the opposing third sides is in a range from 100 degrees to 175 degrees.

Embodiment 146 is the lightguide of embodiment 11, wherein an oblique angle between the opposing third sides is in a range from 110 degrees to 175 degrees.

The invention claimed is:

1. A lightguide comprising:
a light guide body defining an optical axis and having an optical absorption coefficient of at least 0.02 cm$^{-1}$ at a wavelength of 500 nm, an input face configured to receive an incident light, and an output face; and
a plurality of discrete spaced apart light extracting structures configured to extract light propagating within the lightguide by total internal reflection, each light extracting structure comprising a first surface configured to extract light propagating in a first direction along the optical axis and a second surface configured to extract light propagating in a second direction along the optical axis, the first surface and the second surface intersecting at a peak, each light extracting structure having an extraction efficiency of less than 2%, wherein the first surface and second surface make an angle with each other that is larger than 90 degrees, and wherein the angle between the first surface and the second surface of at least one of the plurality of light extracting structures is different than the angle between the first surface and the second surface of at least one other of the plurality of light extracting structures, wherein one of the first surface and the second surface of at least one light extracting structure comprises an arcuate surface, wherein at least one plane tangent to the arcuate surface makes a first angle with the optical axis that is less than 45 degrees and greater than 10 degrees, and wherein the other of the first surface and the second surface is substantially planar.

2. A lighting system comprising:
the lightguide of claim 1; and
a light source configured to emit light into the input face of the light guide, the light from the light source having a first power and an $x_1$ color coordinate in a range from 0.2 to 0.4 and a $y_1$ color coordinate in a range from 0.1 to 0.4; and
wherein light propagating within the lightguide along the optical axis and being extracted by the plurality of discrete light extracting structures exits the output face as an output light having a second power and ($x_2$, $y_2$) color coordinates, a ratio of the second power to the first power being at least 10%, an absolute value of a difference between $x_1$ and $x_2$ being no more than 0.03 and an absolute value of a difference between $y_1$ and $y_2$ being no more than 0.05.

* * * * *

UNITED STATES PATENT AND TRADEMARK OFFICE
CERTIFICATE OF CORRECTION

PATENT NO. : 11,041,985 B2
APPLICATION NO. : 16/136489
DATED : June 22, 2021
INVENTOR(S) : Fei Lu Page 1 of 1

It is certified that error appears in the above-identified patent and that said Letters Patent is hereby corrected as shown below:

In the Specification

Column 13
Line 30, Delete ""r" and insert -- $\tau$ --, therefor.

Column 13
Line 31, Delete ""r" and insert -- $\tau$ --, therefor.

Column 13
Line 32, Delete ""r" and insert -- $\tau$ --, therefor.

Column 13
Line 36, Delete ""r" and insert -- $\tau$ --, therefor.

Column 16
Line 3, Delete ""13" and insert -- $\beta$ --, therefor.

Column 23
Line 13, Delete ""$y_z$" and insert -- $y_2$ --, therefor.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*